(12) United States Patent
Kim

(10) Patent No.: US 6,288,757 B1
(45) Date of Patent: Sep. 11, 2001

(54) APPARATUS AND METHOD FOR CORRECTING CONVERGENCE OF TELEVISION

(75) Inventor: Soung-gyu Kim, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/492,299

(22) Filed: Jan. 27, 2000

(30) Foreign Application Priority Data

Jan. 26, 1999 (KR) .................................................. 99-2334

(51) Int. Cl.⁷ .............................. H04N 3/22; H04N 3/26; H04N 3/223; H04N 3/227
(52) U.S. Cl. .................. 348/807; 315/8; 315/368.11; 348/745; 348/807
(58) Field of Search ..................... 315/8, 368.11, 315/368.12, 368.18, 368.24; 348/745, 746, 747, 806, 807, 820; H04N 3/22, 3/23, 3/26, 3/223, 3/227

(56) References Cited

U.S. PATENT DOCUMENTS

| | | | |
|---|---|---|---|
| 4,816,908 | * 3/1989 | Colineau et al. | 358/60 |
| 4,870,329 | * 9/1989 | Ara | 315/368 |
| 5,510,677 | * 4/1996 | Nagashima | 315/8 |
| 5,550,598 | * 8/1996 | Itoh et al. | 348/807 |
| 5,966,124 | * 10/1999 | Devine | 345/339 |
| 5,978,044 | * 11/1999 | Choi | 348/806 |
| 6,011,592 | * 1/2000 | Vaughan et al. | 315/368.12 |
| 6,014,168 | * 1/2000 | Webb et al. | 348/806 |
| 6,130,505 | * 10/2000 | Webb et al. | 315/8 |

* cited by examiner

Primary Examiner—Reinhard J. Eisenzopf
Assistant Examiner—Brian P. Yenke
(74) Attorney, Agent, or Firm—Sughrue, Mion, Zinn, Macpeak & Seas, PLLC

(57) ABSTRACT

A convergence correcting apparatus and method of a television for automatically correcting convergence in consideration of terrestrial magnetism of a television location set by a user. Convergence is adaptively corrected in consideration of the terrestrial magnetism of a territory at which a television is installed, thereby preventing picture quality from deteriorating due to differences in the terrestrial magnetism of different territories.

9 Claims, 5 Drawing Sheets

FIG. 4A

| COUNTRY | NO. | COUNTRY | NO. |
|---|---|---|---|
| GHANA | 001 | ARGENTINA | 002 |
| GUINEA | 003 | IRELAND | 004 |
| GREECE | 005 | ALGERIA | 006 |
| NIGERIA | 007 | ENGLAND | 008 |
| NETHERLAND | 009 | YEMEN | 010 |
| NEPAL | 011 | URAGUAY | 012 |
| NORWAY | 013 | YUGOSLAVIA | 014 |
| NEW ZEALAND | 015 | ETHIOPIA | 016 |
| KOREA | 017 | IRAN | 018 |
| ⋮ | ⋮ | ⋮ | ⋮ |
| SWEDEN | 051 | POLAND | 052 |
| SWITZERLAND | 053 | FRANCE | 054 |
| SPAIN | 055 | PHILLIPPINES | 056 |
| SLOVENIA | 057 | HUNGARY | 058 |
| SINGAPORE | 059 | AUSTRALIA | 060 |
| U.A.E. | 061 | | |

FIG. 4B

| COUNTRY | VERTICAL | HORIZONTAL | COUNTRY | VERTICAL | HORIZONTAL |
|---|---|---|---|---|---|
| | mG | | | mG | |
| GHANA | −50 | 320 | ARGENTINA | −150 | 250 |
| GUINEA | −150 | 250 | IRELAND | 500 | 150 |
| GREECE | 380 | 280 | ALGERIA | 200 | 300 |
| NIGERIA | −50 | 330 | ENGLAND | 470 | 170 |
| NETHERLAND | 470 | 370 | YEMEN | 100 | 370 |
| NEPAL | 300 | 370 | URAGUAY | −150 | 230 |
| NORWAY | 500 | 150 | YUGOSLAVIA | 410 | 230 |
| NEW ZEALAND | −500 | 250 | ETHIOPIA | 50 | 360 |
| KOREA | 380 | 310 | IRAN | 300 | 300 |
| ⋮ | ⋮ | ⋮ | ⋮ | ⋮ | ⋮ |
| SWEDEN | 500 | 150 | POLAND | 450 | 180 |
| SWITZERLAND | 430 | 200 | FRANCE | 430 | 220 |
| SPAIN | 380 | 0 | PHILLIPPINES | 50 | 380 |
| SLOVENIA | 410 | 230 | HUNGARY | 430 | 200 |
| SINGAPORE | −150 | 400 | AUSTRALIA | −500 | 250 |
| U.A.E. | 220 | 350 | | | |

APPARATUS AND METHOD FOR CORRECTING CONVERGENCE OF TELEVISION

BACKGROUND OF THE INVENTION

1. Field of the Invention

The present invention relates to an apparatus and method for correcting the convergence of a television, and more particularly, to a television convergence correcting apparatus and method for automatically correcting the convergence of a television in consideration of the terrestrial magnetism of a television location set by a user.

2. Description of the Related Art

In general, projection televisions, which are greatly affected by terrestrial magnetism, include a red (R)-cathode ray tube (CRT) 101, a green (G)-CRT 102 and a blue (B)-CRT 103 and display signals output from the respective CRTs on a screen 105 via a mirror 104, as shown in FIG. 1. Here, three color signals of R, G and B are combined at a position to produce an image on a screen. In order to accurately combine the signals, convergence correction is necessary.

FIG. 2 shows parts which perform convergence correction in the respective CRTs constituting a projection television.

First, correction signals for convergence correction are transmitted to an amplifier 203 via a filter 201 and an input matching portion 202 to be amplified and then output to a deflection coil 204 which is a convergence yoke. Then, convergence correction is performed with respect to light irradiated from a CRT. A feedback portion 205 receives some of the correction signals output to the deflection coil 204 through the amplifier 203 and allows the amplifier 203 to operate in a stable state.

According to the conventional technology, convergence correction is performed by forcibly setting correction values depending on the terrestrial magnetism of territories in which the products supplied by various manufacturers are used.

However, when the projection television is transferred from one territory to another territory, wherein each of the two territories have different terrestrial magnetism, the convergence correction performed by forcibly setting correction values for terrestrial magnetism of a pertinent territory may cause mis-convergence due to a difference in the terrestrial magnetism between the two territories, resulting in an unclear image.

SUMMARY OF THE INVENTION

To solve the above problems, it is an objective of the present invention to provide a convergence correcting apparatus and method used in a television, for automatically correcting convergence according to the corresponding terrestrial magnetism of a user's selected territory where the television is positioned.

Accordingly, to achieve the above objective, there is provided a convergence correcting apparatus of a television including an input portion through which a user inputs the name of a territory at which the television is installed, a storage portion for storing position data, and for storing basis data for convergence correction corresponding to the position data, a controller for reading from the storage portion the basis data for convergence correction corresponding to the territory name input through the input portion, and an operation unit for applying the basis data for convergence correction, which is received from the controller, to a predetermined convergence operation formula to operate convergence adjustment data.

According to another aspect of the present invention, there is provided a convergence correcting method of a television including the steps of (a) selecting and inputting the name of a territory at which the television is installed, (b) reading basis data for convergence correction corresponding to the position data of the territory name input in step (a), (c) applying the basis data for convergence correction read in step (b) to a predetermined convergence operation formula to obtain convergence adjustment data, and (d) applying a voltage corresponding to the convergence adjustment data to correct the convergence.

BRIEF DESCRIPTION OF THE DRAWINGS

The above objective and advantages of the present invention will become more apparent by describing in detail a preferred embodiment thereof with reference to the attached drawings in which:

FIGS. 4A and 4B illustrate examples of a look-up table pre-stored in a storage portion according to the present invention.

DESCRIPTION OF THE PREFERRED EMBODIMENT

Figure 1:
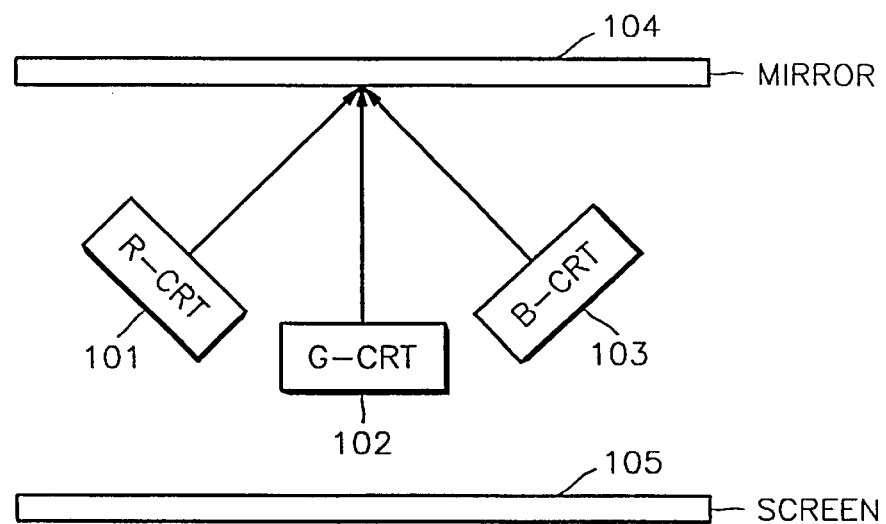
FIG. 1 is a schematic diagram illustrating a general projection television.
Figure 2:
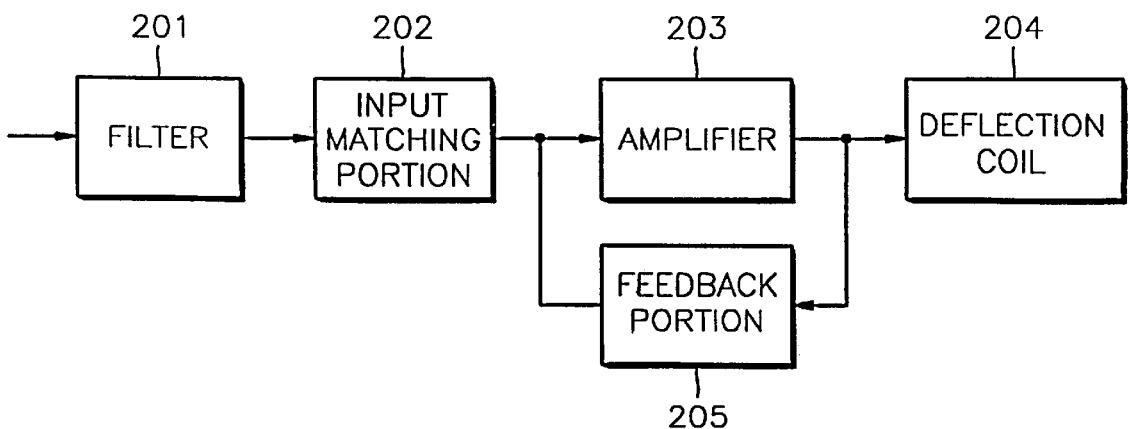
FIG. 2 is a block diagram illustrating a conventional convergence correcting apparatus.
Figure 3:
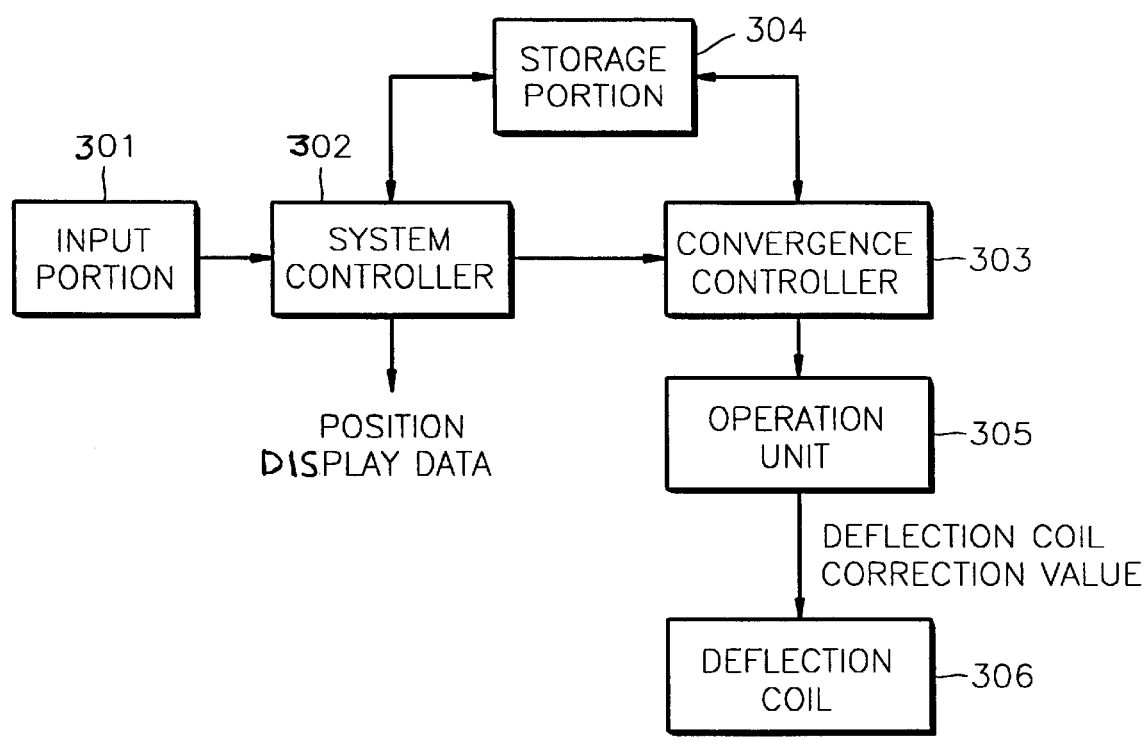
FIG. 3 is a block diagram illustrating a convergence correcting apparatus of a television according to the present invention.

A convergence correcting apparatus of a television according to the present invention includes an input portion 301, a system controller 302, a convergence controller 303, a storage portion 304, an operation unit 305 and a deflection coil 306, as shown in FIG. 3.

Referring to FIGS. 3 through 4B, a location at which a television is installed is selected by user's manipulation of key buttons of the input portion 301. Here, the input portion 301 may be a remote controller.

Various kinds of system data are stored in the storage portion 304. In particular, position data, and basis data for convergence correction corresponding to the position data, are stored as look-up table type data, as shown in FIGS. 4A and 4B. For example, territories are sorted by country, and codes are assigned thereto, as shown in FIG. 4A. Also, as shown in FIG. 4B, terrestrial magnetism values are stored for countries which have corresponding codes. Then, although not shown in FIG. 4B, basis data for convergence correction corresponding to the terrestrial magnetism are drawn as a look-up table and then stored. Here, the basis data for convergence correction is determined in consideration of the effect of the terrestrial magnetism. The storage portion 304 may be constructed of an erasable programmable read only memory (EPROM).

The system controller 302 controls the system as a whole. In particular, if a user selects a position input mode by manipulating a key button of the input portion 301, the system controller 302 converts the mode of the system into a position input mode and controls peripheral functional blocks to display a position data menu on a display means (not shown) so that the user can select a territory. Also, the system controller 302 reads the position data corresponding to the user's selected territory from the look-up table of the storage portion 304 to then output the read data to the convergence controller 303.

The convergence controller 303 executes an overall control operation for convergence correction. In particular, the convergence controller 303 compares the position data applied from the system controller 302 with the currently set position data for correcting convergence, and, if different, reads from the look-up table of the storage portion 304 the basis data for convergence correction, corresponding to the terrestrial magnetism value -for the position data applied from the system controller 302, to then output the read data to the operation unit 305.

The operation unit 305 applies the basis data for convergence correction applied from the convergence controller 304 to a preset convergence operation formula, performs an operation for convergence correction to obtain convergence adjustment data and outputs the obtained data to the deflection coil 306.

Then, the deflection coil 306 determines the degree of deviation of a beam using the convergence adjustment data, thereby correcting convergence.

Figure 5:
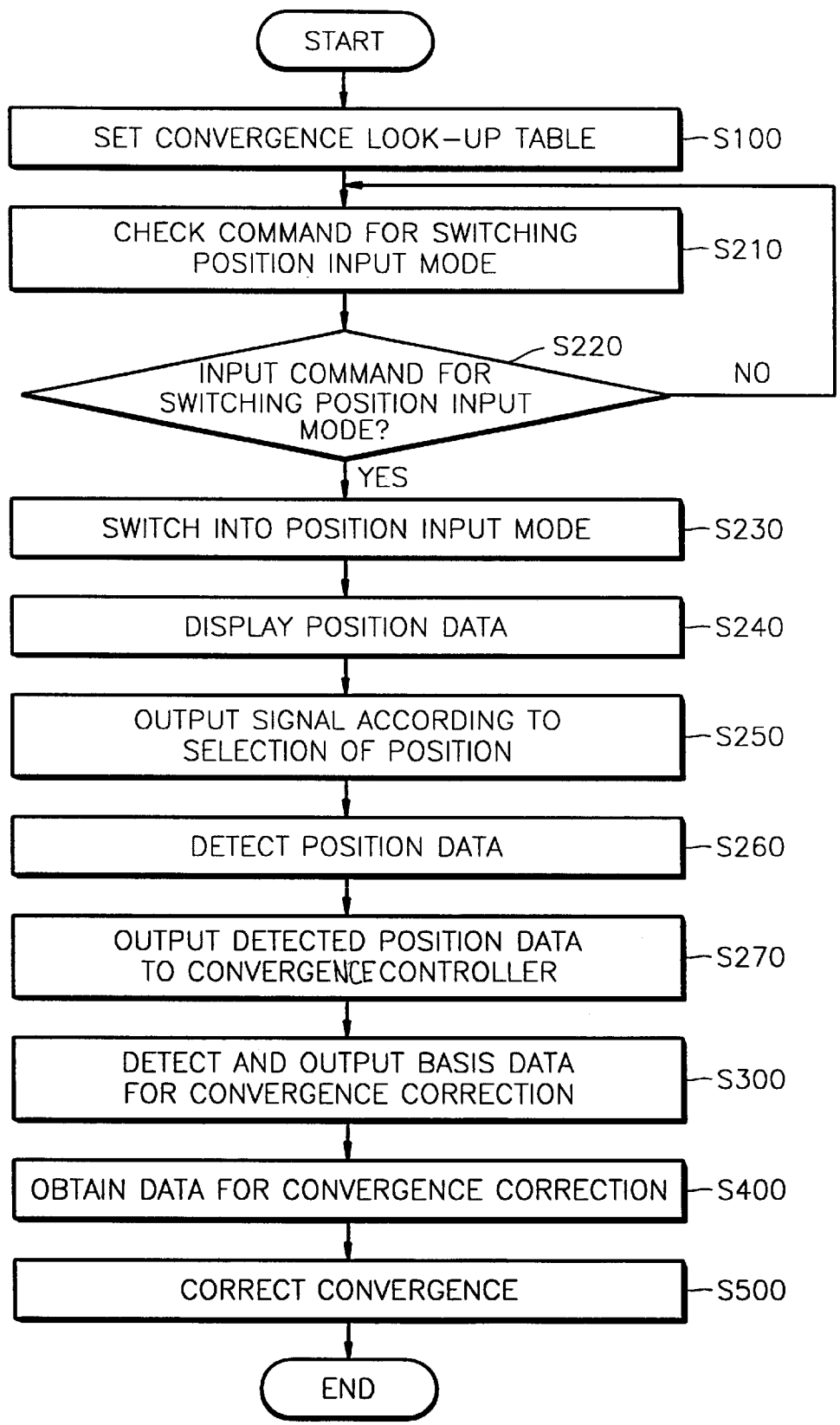
FIG. 5 is a flow chart illustrating a convergence correcting method of a television according to the present invention.

A method for correcting convergence of a television according to the present invention will now be described with reference to FIGS. 3 and 5.

First, position data, and basis data for convergence correction corresponding to the position data, are stored in the storage portion 304 in the form of a look-up table (step S100). The basis data for convergence correction are values obtained in consideration of the effect of terrestrial magnetism corresponding to the position data.

Then, it is checked by the system controller 302 whether a command for switching a position input mode is input through the input portion 301 or not. In other words, if a user inputs a command for switching a position input mode by manipulating a key button of the input portion 301 (steps S210 and S220), the mode of the system is switched into the position input mode (step S230) and then a position data menu is displayed so that the user can select the position data (step S240). If the user selects a territory from the displayed position data menu by manipulating a key button of the input portion 301 (step S250), the system controller 302 detects the position data corresponding to the selected territory from the look-up table of the storage portion 304 (step S260) and reads the detected position data to then output the same to the convergence controller 303 (step S270).

Then, the convergence controller 303 compares the position data applied from the system controller 302 with the currently set position data, and, if different, detects from the look-up table of the storage portion 304 the basis data for convergence correction, corresponding to the position data applied from the system controller 302, to then output the detected data to the operation unit 305 (step S300).

Next, the operation unit 305 applies the basis data for convergence correction to a preset convergence operation formula, performs an operation for convergence correction to obtain convergence adjustment data and outputs the obtained data to the deflection coil 306 (step S400). The convergence is corrected by the obtained convergence adjustment data (step S500).

Therefore, in the method for correcting convergence according to a user's manipulation of a key button of the input portion 301, according to the terrestrial magnetism of a location at which the television is installed, in the case where mis-convergence occurs due to a difference in terrestrial magnetism when the position of the television is changed, the convergence can be easily corrected by the user.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

As described above, according to the present invention, the convergence is adaptively corrected in consideration of the terrestrial magnetism of a territory at which a television is installed, thereby preventing picture quality from deteriorating due to differences in the terrestrial magnetism of different territories.

What is claimed is:

1. A convergence correcting apparatus of a television comprising:

an input portion through which a user inputs a name of a territory where the television is located;

a storage portion storing position data and basis data for convergence correction corresponding to the position data;

a controller for reading from the storage portion the basis data for convergence correction corresponding to the territory name; and an operation unit for applying the basis data for convergence correction, which is received from the controller, to a predetermined convergence operation formula to obtain convergence adjustment data.

2. The convergence correcting apparatus according to claim 1, wherein the controller comprises:

a system controller for reading the position data corresponding to the territory name from the storage portion; and a convergence controller for reading the basis data for convergence correction from the storage portion, the basis data corresponding to the position data.

3. The convergence correcting apparatus according to claim 1, wherein the storage portion stores the position data by territory and the basis data for convergence correction, the basis data corresponding to the position data, in the form of a look-up table.

4. The convergence correcting apparatus according to claim 3, wherein the position data of the look-up table is sorted by territories having different terrestrial magnetism.

5. The convergence correcting apparatus according to claim 2, wherein the convergence controller compares the position data applied from the system controller with currently set position data for correcting convergence, and, only if the position data applied from the system is different from the currently set position data, the convergence correcting apparatus reads from the storage portion the basis data for convergence correction.

6. A convergence correcting method of a television comprising the steps of:

(a) determining and inputting the name of a territory where the television is installed;

(b) reading basis data for convergence correction corresponding to the position data of the territory name input in step (a);

(c) applying the basis data for convergence correction read in step (b) to a predetermined convergence operation formula to obtain convergence adjustment data; and (d) applying a voltage corresponding to the convergence adjustment data to correct the convergence.

7. The convergence correcting method according to claim 6, wherein the position data by territory and the basis data for convergence correction are stored in the form of a look-up table.

8. The convergence correcting method according to claim 7, wherein the position data of the look-up table is sorted by territories having different terrestrial magnetism.

9. The convergence correcting method according to claim 6, wherein step (a) comprises the sub-steps of:

(a1) determining whether a command for switching a position input mode is input or not;

(a2) if it is determined in step (a1) that the command for switching a position input mode is input, converting a currently set mode into the position input mode and displaying a position data menu for selecting position data; and (a3) detecting position data selected from the position data menu.

* * * * *